Figure 1:
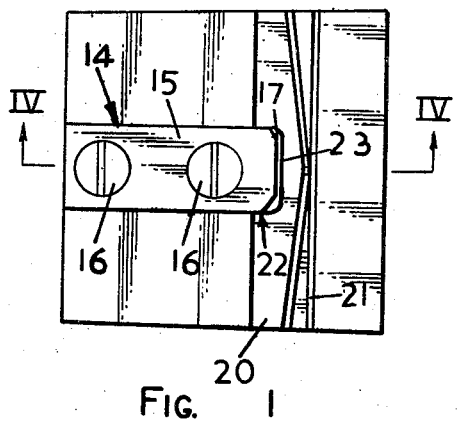

June 14, 1955      J. W. RANOUS      2,710,442
TOOL HOLDER
Filed March 31, 1952

INVENTOR
JACK W. RANOUS
BY
ATTORNEY

United States Patent Office 2,710,442
Patented June 14, 1955

2,710,442
TOOL HOLDER

Jack W. Ranous, Saginaw, Mich., assignor to Mitts and Merrill, Saginaw, Mich., a corporation of Michigan Application March 31, 1952, Serial No. 279,595

6 Claims. (Cl. 29—96)

This invention relates to machine tools and more particularly to a mounting for holding a cutting tip where the tip constitutes an insert in the cutting block.

When cutting tools were designed so that the block and blade was a single piece of steel, the problem giving rise to my invention did not occur. However, with the advent of special, superhard cutting tips such as those made of carbide and materials having similar characteristics specially selected for their durability under machine tooling conditions, it became essential to provide a tip holding block and a small, separate cutting tip. The advent of the separate cutting tip raised several serious problems which, until my invention, had not been satisfactorily solved. Great difficulty has been encountered in rigidly securing these tips to their mounting blocks. This difficulty has arisen from the fact that these blocks are normally small and the forces imposed upon them in the cutting operation tend to unseat them unless they are securely and rigidly held. Even in those cases where a secure and rigid mounting has been effected when the cutting tip is first put in operation, these mountings have been found to subsequently fail. This failure has been due to wear or vibration, especially when the cutting tool chatters and to forces applied to the cutting tip at an angle to the direction in which the cutting tip is moved. This difficulty of providing a secure and durable support for the cutting tip has been solved by my invention.

A further problem has been caused by the necessity for periodically replacing the cutting tips. Since the cutting tip is the only portion of the cutting tool which should experience appreciable wear, only the cutting tip need be replaced when it is worn. In the use of certain materials for the cutting tip, the tip itself is brittle and injury to the tip such as chipping is frequently experienced. When a tip is chipped it is necessary to replace the tip. For this purpose, the tip must be made readily removable. Heretofore, these cutting tips have, in general, not been made replaceable and where they have been made replaceable the task of effecting replacement has been long and tedious. My invention overcomes this difficulty by providing a simple means for holding the tip while permitting the tip to be quickly and easily replaced or removed for servicing such as sharpening. Although permitting the tip to be removed, the structure of my invention provides a positive support for the tip.

Another problem which has arisen by reason of the use of these tips is the necessity for compensating for wear when the tool is used over a long period of time and is subjected to repeated sharpenings. In order that the tool will be caused to make a precise cut it is essential that its cutting edge be constantly maintained in a fixed relationship to a given point on the machine operating the cutting tool. My invention permits rapid and precise adjustment of the tool every time such compensation becomes necessary.

These and other objects and purposes of my invention will be immediately seen by those acquainted with the design and manufacture of machine tools upon reading the following specification and the accompanying drawings.

Figure 2:
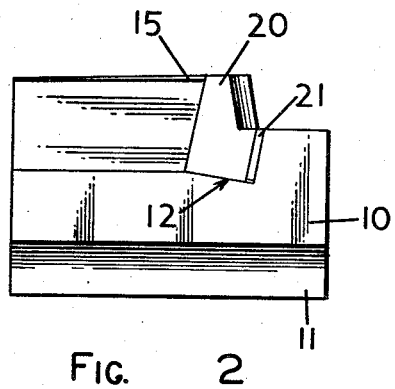
Figure 3:
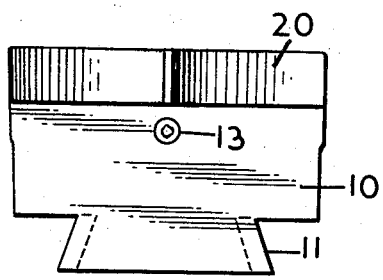
Figure 4:
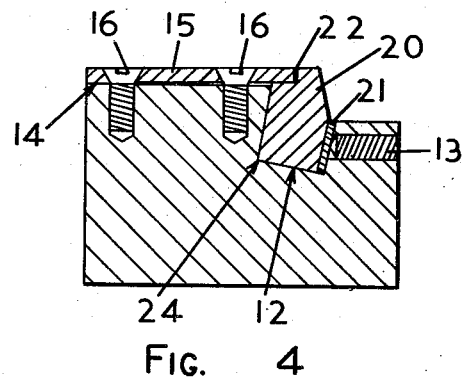

In the drawings:
Figure 1 is a plan view of my invention.
Figure 2 is a side, elevation view of my invention.
Figure 3 is a front, elevation view of my invention.
Figure 4 is a sectional view of my invention taken along the plane IV—IV of Figure 1.

In executing the objects and purposes of my invention, I have provided a cutting tool mounting block or anvil having a step at its forward end. A forwardly inclined and upwardly open slot is provided in this block at the step. Within this slot the cutting tip is mounted and secured by a set screw engaging its lower, forward face and a plate pressing downwardly against its upward face. This plate is seated in a closely fitting channel in the block and in a similar channel in the cutting tool. By reason of the plate and the set screw, the cutting tool is positively held against movement in any direction including any tendency of the cutting tip to rotate out of its slot.

In the following description the terms "forwardly" and "rearwardly" are frequently used and are to be taken to mean "forwardly" in the direction in which the cutting tool is moved during its cutting stroke, that is, toward the right in Figure 4 and "rearwardly" away therefrom. The terms "upwardly" and "downwardly" are also frequently used and are to be taken to mean "upwardly" as my invention is shown in Figure 4 and "downwardly" away therefrom. By designating the directions "upwardly" and "downwardly" in the description of my invention, I select the terms only for the purpose of orientation. The terms are not to be considered as a limitation with respect to the use of my invention.

Referring specifically to the drawings, the numeral 10 indicates a cutting tip seat or block having a key 11 along its lower face. The key 11 is centered on the block and is parallel to the operating movements of the block. The key 11 is designed to mount the block upon its operating tool.

The block 10 has a step, the forward portion of the block being of lesser height than the rearward portion. Where the forward and rearward portions of the block meet, a channel 12 extends transversely across the block. The channel 12 is inclined forwardly from the vertical at a small angle, preferably 8°. The channel 12 must be cut to close tolerances whereby the forward and rearward walls are parallel and the bottom wall is perpendicular to these walls. A set screw 13, equi-distant from the sides of the block 10 extends into the channel 12 from the forward face of the block.

Centered between the sides of the block a channel or groove 14 extends forwardly and rearwardly in the top face of the block. The groove 14 is rectangular in cross-section and is cut to close tolerance. Seated in the groove 14 is a plate 15. The plate 15 is designed to snugly but removably seat within the groove whereby there can be no lateral play between the plate and the side walls of the groove. The plate is detachably secured by a pair of screws 16 threadedly engaging the block 10. One end of the plate 15 extends over into the channel 12 for reasons which will be explained more fully hereinafter. The corners 17 of the forward end of the plate 15 are chamfered.

The cutting tip 20 is designed to seat in the channel 12. It is provided with accurately shaped rearward and bottom walls to securely seat against the bottom and rearward walls of the channel 12 whereby it will be firmly supported. The cutting tip 20 is normally made slightly narrower than the channel 12 and the resulting space is filled with a spacer or shim 21. The cutting tip 20 is shown as having a shallow V-shape with the apex directed forwardly and centered with respect to the block 10. The particular shape of the cutting edge is immaterial to my invention and is shown only for the sake of completeness. It will be recognized that the shape of the cutting face of the cutting tip will depend upon the shape of the cut desired and the type of work being performed.

The height of the cutting tip 20 is such that it extends slightly above the top face of the block 10 (Figure 4). The purpose of this will be explained under "operation." At its center, the cutting tip 20 has a notch 22 of such width that it will snugly receive the forward end of the plate 15 and of such depth that the plate, when seated therein, is flush with the top of the cutting tip. The notch 22 opens through the rearward face of the cutting tip and extends forwardly only a portion of the thickness of the cutting tip. A slight gap 23 is left between the end of the notch 22 and the end of the plate 15 to eliminate binding due to tolerance accumulations in the size of the notch and the length of the plate.

The preceding description is of a preferred construction for my invention. It is preferred because it provides maximum support for the cutting tip and also maximum resistance to movement of the cutting tip. It is possible to construct my invention with the groove 14 perpendicular to the general plane of the block, eliminating the inclination of the walls of this groove. It is also possible to construct my invention with a non-rectangular groove whereby the corner 24 will depart somewhat from the 90° angle shown and described.

*Operation*

The block 10 is designed to be mounted on the machine tool and acts as a support and holder for the cutting tip 20. When the shape of the cut is to be changed, the tip sharpened or replaced, it is necessary only to remove the cutting tip 20. In seating the cutting tip, the plate 15 is released by removing the screws 16. Normally, the screws 16 need not be entirely removed but may be loosened sufficiently that, with the plate 15 raised, the cutting tip may be inserted without interference. The cutting tip is seated in the channel 12 and a shim 21 of the necessary thickness is inserted against the forward face of the cutting tip to secure the cutting tip tightly in position. It will be recognized that the shim 21 may consist of a single thickness or a number of shims having the necessary accumulative thickness. The cutting tip is designed to seat snugly against the rearward and bottom faces of the channel 12. With the cutting tip thus in position, the screws 16 are tightened, the tightening of the screws 16 brings the plate 15 into the notch 22. Further tightening of the screws 16 causes the forward end of the plate to bear tightly against the cutting tip 20. Since the cutting tip 20 is slightly higher than the face of the block 10 and the notch 22 is only of sufficient depth to receive the plate 15, the tightening of the screws 16 will cause the plate to bend slightly, thereby assuring tight bearing against the tip 20. By reason of the chamfered corners 17, the plate will not interfere with the radiused corners of the notch 22 and by reason of the gap 23 no interference will occur between the end of the plate 15 and the end of the notch 22. After the plate 15 has been secured, the set screw 13 is tightened to securely hold the shim 21 and to press the cutting tip 20 securely into the lower, rearward corner 24 of the channel 12.

Cutting is effected by reciprocating the block in a forward and rearward direction with the forward movement constituting the cutting stroke. During the cutting operation, the forces generated by the engagement of the cutting tip with the work tend to push the cutting tip downwardly and rearwardly. For this reason, it is essential that firm support be provided for the cutting tip by the rearward and bottom walls of the channel 12. At the same time, these forces tend to rotate the tip counter-clockwise. This rotary movement is resisted by the shim 21 secured by the set screw 13. For this reason, it is essential that the shim 21 snugly fill the gap between the forward face of the cutting tip and the forward wall of the channel 12. Upward movement of the cutting tip is prevented by the positive engagement of the plate 15 with the bottom of the notch 22. At the same time, the plate 15 prevents lateral movement of the cutting tip by the snug engagement between the walls of the notch and the sides of the plate. The plate itself is held against lateral movement under the influence of the cutting tip 20 both by the screws 16 and by the tight engagement between the sides of the groove 14 and the sides of the plate. It is thus seen that the cutting tip, though easily and quickly replaceable, is securely held against movement in any direction by a structure which is both simple and highly efficient.

Periodically, it becomes necessary to sharpen the cutting tip. When this is done, the forward cutting edge of the cutting tip is ground back. This results in a misalignment between the forward cutting edge of the cutting tip and the reference point on the machine tool. To compensate for this sharpening, the cutting tip must be moved forwardly to place the cutting edge in its former position. To do this, shims are placed between the rearward face of the cutting tip and the rearward wall of the channel 12. These shims will be of a thickness equal to the thickness of the material removed from the cutting tip during the sharpening process. At the same time, the shim 21 is replaced by another shim of lesser thickness to permit the forward movement of the cutting tip. As the cutting tip is moved forward after each sharpening operation, by reason of the forwardly and downwardly inclined bottom wall of the channel 12 the tip will tend to project a lesser distance above the top of the block 10. Compensation for this may be effected either by adjusting the position of the work or by placing a shim between the bottom face of the cutting tip 20 and the bottom wall of the channel 12. When such a shim is used, the height of the cutting tip will remain the same. When the shim is not used, the relative lowering of the cutting tip will tend to close a portion of the gap between the plate 15 and the bottom of the groove 14. This gap, however, is designed to be sufficient to permit this adustment. At no time should the gap between the plate 15 and the block 10 be entirely eliminated whereby a secure engagement is assured between the plate 15 and the notch 22.

When the cutting tip has been worn to the point where it is no longer capable of being sharpened or it is damaged, it may be replaced simply by loosening the screws 16 and the set screw 13, removing the cutting tip 20 and any shims which may be between the cutting tip and the rearward and bottom faces of the channel 12. When the replacement cutting tip is inserted, a shim 21 only will be used to secure it in position.

It wil be recognized that my invention makes the cutting tip quickly and easily removable for sharpening or for replacement. At the same time, my invention provides a simple but effective holding means for the cutting tip, preventing all shifting of the cutting tip during operation. My invention is effective in positively holding the cutting tip even under maximum operating loads, a result not heretofore accomplished with removable cutting tips. At the same time, the cutting tip is adequately supported, permitting it to be used to its maximum capacity without danger of injury due to insufficient support. Various modifications of my invention may be made each without departing from the principle of my invention. Each of these modifications is to be considered as included in the hereinafter appended calims, unless the language of these claims expressly provides otherwise.

I claim:

1. In means for mounting a cutting tip, the combination comprising: a supporting block; a transverse channel adjacent one end of said block, said channel being inclined at a small angle toward said one end; a cutting tip seated in said channel; said cutting tip having a notch in one face, said notch opening through the wall of said cutting tip remote from said one end of said block; a groove in said block aligned with said notch in said cutting tip; a plate seated in said groove and detachably secured to said block; one end of said plate being received into said notch; the walls of said groove and of said notch snugly engaging said plate; a spacer between said cutting tip and the wall of said channel adjacent said one end; means at said one end of said block for detachably engaging said spacer adjacent the bottom of said channel.

2. In means for mounting a cutting tip, the combination comprising: a supporting block; a transverse channel adjacent one end of said block, said channel being inclined at a small angle toward said one end; a cutting tip seated in said channel; said cutting tip having a notch in one face, midway between the ends of said cutting tip, said notch opening through the wall of said cutting tip remote from said one end of said block; a groove in said block aligned with said notch in said cutting tip, said groove being centered between the sides of said block; a plate seated in said groove and detachably secured to said block; one end of said plate being received into said notch; the walls of said groove and of said notch snugly engaging said plate; means at said one end of said block for detachably engaging said cutting tip adjacent the bottom of said channel.

3. In means for mounting a cutting tip, the combination comprising: a supporting block; a transverse channel adjacent one end of said block, said channel being inclined at a small angle toward one end of said block; said block being of lesser thickness on the side of said channel adjacent said one end; said channel having a rectangular cross-sectional shape; a cutting tip seated in said channel; that portion of said cutting tip received into said channel having a rectangular cross-sectional shape; said cutting tip having a notch in the face thereof remote from the bottom of said channel, said notch opening through the wall of said cutting tip remote from said one end of said block and midway between the ends of said cutting tip; a groove in said block aligned with said notch in said cutting tip, and centered between the sides of said block; a plate snugly seated in said groove, one end of said plate being received into said notch and snugly engaging the sides of said notch; means for detachably securing said plate to said block and urging said plate tightly against said cutting tip, said notch being spaced outwardly from said block whereby said plate is spaced from the bottom of said groove adjacent said cutting tip; a spacer between said cutting tip and the wall of said channel adjacent said one end; a set screw mounted in said one end of said block, said set screw bearing against said spacer for urging said cutting tip away from said one end of said block.

4. In means for mounting a cutting tip, the combination comprising: a supporting block; a transverse channel adjacent one end of said block, said channel being inclined at a small angle toward one end of said block and adapted to receive said cutting tip; said block being of lesser thickness on the side of said channel adjacent said one end; said channel having a rectangular cross-sectional shape; a groove in said block and centered between the sides of said block; a plate snugly seated in said groove; means for detachably securing said plate to said block; a set screw mounted in said one end of said block, said set screw entering said channel and adapted to contact said cutting tip.

5. In a holder for cutting tips the combination including: a tool holder base having a transverse channel thereacross paralleling the front edge of said base, said channel being inclined forwardly of said base and said base having a groove on one face perpendicular to and extending into said channel; an elongate cutting tip matingly insertable in said channel and having a recess coinciding with said groove in said base; a plate adjustably and detachably seated in said groove, one end of said plate extending into the recess of said cutting tip in snug engaging relationship; and adjustable means intermediate said cutting tip and the walls of said channel in said base for positioning said cutting tip.

6. A cutting tip comprising: a substantially elongated body generally rectangular in cross section having a cutting edge on one surface thereof; a transverse recess located intermediate the ends thereof and forming a slot having a rectangular cross section and opening from the side of said cutting tip opposite the working face thereof and said cutting tip having in cross section a substantial depth to support the cutting edge.

References Cited in the file of this patent

UNITED STATES PATENTS

| | | |
|---|---|---|
| 470,245 | Kempsmith et al. | Mar. 8, 1892 |
| 2,537,837 | Labrozzi et al. | Jan. 9, 1951 |

OTHER REFERENCES

American Machinist, Feb. 14, 1946, page 146.